(12) United States Patent
Jeong et al.

(10) Patent No.: US 8,408,510 B2
(45) Date of Patent: Apr. 2, 2013

(54) APPARATUS FOR PREVENTING ROTATION OF SEAT FRAME FOR VEHICLE

(75) Inventors: Chan Ho Jeong, Seoul (KR); Sang Do Park, Ansan-si (KR); Hak Gyun Kim, Hwaseong-si (KR); Bong Ku Kim, Hwaseong-si (KR); Tae Hoon Lee, Hwaseong-si (KR); Jong Kweon Pyun, Suwon-si (KR); Sang-Nam Park, Asan-si (KR); Yong-Hee Shin, Seoul (KR)

(73) Assignees: Hyundai Motor Company, Seoul (KR); Kia Motors Corporation, Seoul (KR); Hyundai Dymos Inc., Seosan-Si (KR)

( * ) Notice: Subject to any disclaimer, the term of this patent is extended or adjusted under 35 U.S.C. 154(b) by 0 days.

(21) Appl. No.: 13/174,641

(22) Filed: Jun. 30, 2011

(65) Prior Publication Data
US 2012/0139306 A1    Jun. 7, 2012

(30) Foreign Application Priority Data
Dec. 1, 2010   (KR) .................. 10-2010-0121377

(51) Int. Cl.
*F16M 13/00* (2006.01)
(52) U.S. Cl. .............. 248/421; 248/423; 297/344.15
(58) Field of Classification Search .......... 248/157, 248/419, 420, 421, 422, 423, 424, 425; 297/344.12, 297/344.13, 344.14, 344.15, 344.16, 344.17, 297/344.18, 344.19, 344.2
See application file for complete search history.

(56) References Cited

U.S. PATENT DOCUMENTS

| | | | |
|---|---|---|---|
| 5,782,533 A * | 7/1998 | Fischer et al. | 297/338 |
| 5,882,061 A * | 3/1999 | Guillouet | 296/65.05 |
| 6,347,778 B1 * | 2/2002 | Koga et al. | 248/421 |
| 6,464,193 B1 * | 10/2002 | Nemoto | 248/421 |
| 6,572,065 B2 * | 6/2003 | Koga et al. | 248/421 |
| 6,851,753 B2 * | 2/2005 | Akaike et al. | 297/344.17 |
| 2008/0129093 A1 | 6/2008 | Kim | |
| 2009/0127907 A1 * | 5/2009 | Hoshi et al. | 297/344.12 |

FOREIGN PATENT DOCUMENTS

| | | |
|---|---|---|
| JP | 2009-208737 A | 9/2009 |
| KR | 10-2008-0028792 A | 4/2008 |
| KR | 10-2008-0051411 A | 6/2008 |
| KR | 10-2009-0015452 A | 2/2009 |
| KR | 10-2009-0025600 A | 3/2009 |
| KR | 10-2009-0063583 A | 6/2009 |
| KR | 10-2009-0107332 A | 10/2009 |

* cited by examiner

*Primary Examiner* — Terrell McKinnon
*Assistant Examiner* — Steven Marsh
(74) *Attorney, Agent, or Firm* — Morgan, Lewis & Bockius LLP (57) ABSTRACT

An apparatus for preventing rotation of a seat frame for a vehicle having the seat frame that includes an inner link portion and an outer link portion that may be provided with a height adjustment device to adjust a height of a seat and a rack gear link may include a height link, wherein one end portion of the height link may be pivotally connected to a set bracket and the other end portion thereof may be pivotally connected to a cushion side member, and a rotation prevention link provided on the inner link portion wherein one end portion of the rotation prevention link may be pivotally hinged to the height link and the other end portion thereof may be movably installed on the set bracket.

4 Claims, 7 Drawing Sheets

APPARATUS FOR PREVENTING ROTATION OF SEAT FRAME FOR VEHICLE

CROSS-REFERENCE TO RELATED APPLICATION

The present application claims priority to Korean Patent Application No. 10-2010-0121377, filed on Dec. 1, 2010, the entire contents of which is incorporated herein for all purposes by this reference.

BACKGROUND OF THE INVENTION

1. Field of the invention

The present invention relates generally to a seat frame for a vehicle, and more particularly, to an apparatus for preventing rotation of a seat frame for a vehicle which can prevent a seat frame from rotating when vehicle collision occurs.

2. Description of Related Art

In general, a vehicle seat is composed of a cushion portion that supports the buttocks of a passenger and a backrest portion that supports the back of the passenger.

In the related art, a manual adjustment device is provided to make the backrest portion lie down or stand up, and a technique of moving the cushion portion forward or rearward is applied to secure legroom. Recently, an electrically driven seat using a motor and a gear assembly has been proposed.

A vehicle seat frame in the related art has a structure in which a set bracket installed in the interior of a vehicle is connected by link to cushion side members provided at both side ends of a cushion, and a gear assembly for height adjustment is installed on the lower portion of the cushion to make the cushion ascend or descend through rotation of a motor.

A seat height adjustment device for a vehicle in the related art has a structure in which a height adjustment device having a pinion gear is installed on a cushion side member, and a rack gear link is installed on a link portion, so that the pinion gear of the height adjustment device is driven by a motor to make the cushion ascend or descend in association with the rack gear link.

Figure 1:
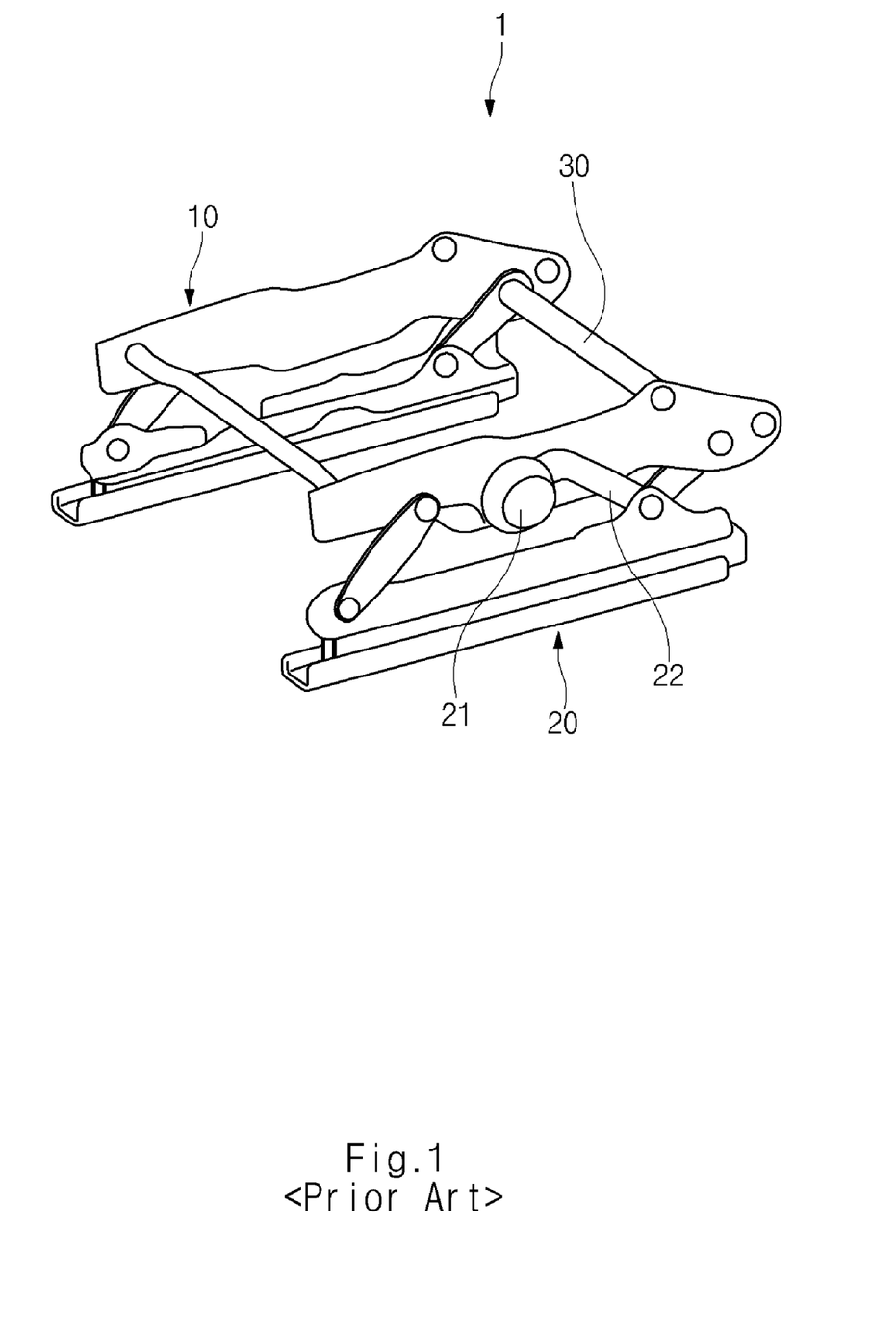
FIG. 1 is a view illustrating a vehicle seat frame in the related art.
Figure 2A:
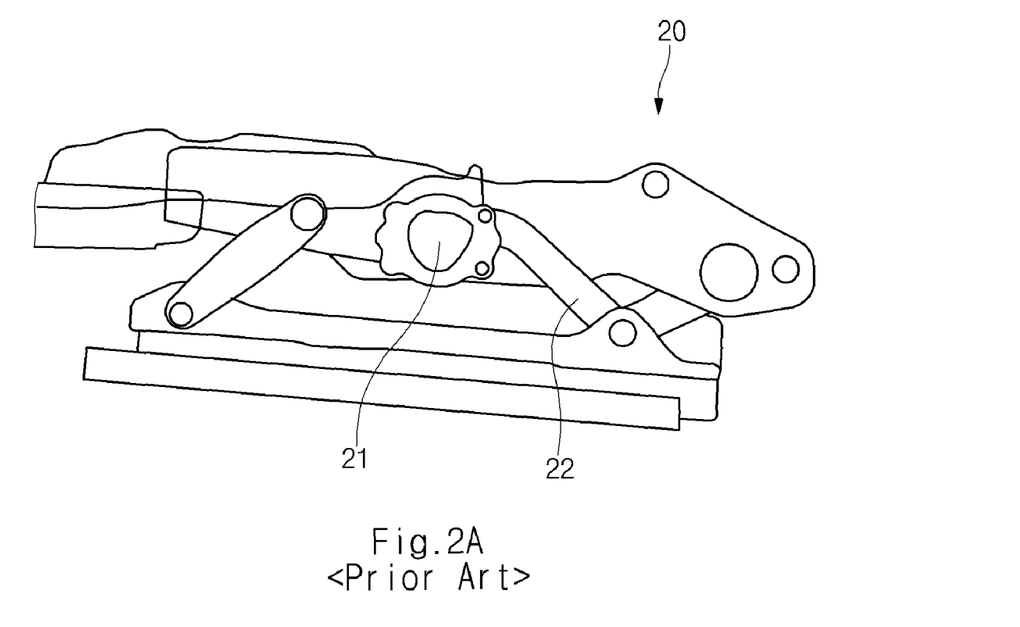
FIG. 2A is a view illustrating an outer link portion and FIG. 2B is a view illustrating an inner link portion.
Figure 2B:
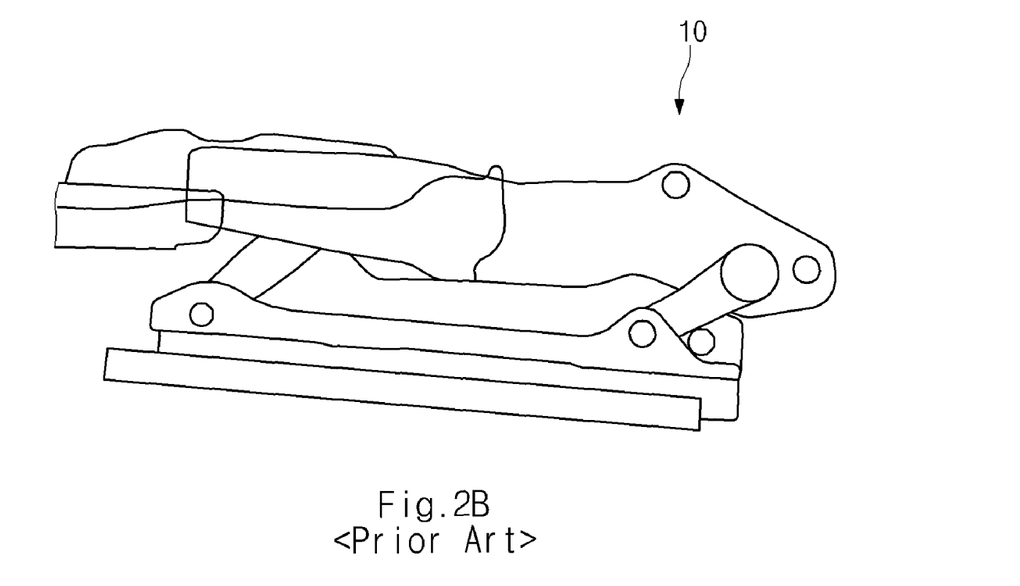

However, as illustrated in FIGS. 1 to 2B, the height adjustment device 21 and the rack gear link 22 in the related art are provided only on one side of a seat frame 1, that is only on a side of a outer link portion 20, and an inner link portion 10 is connected to the outer link portion 20 only through a cross pipe 30.

Accordingly, when vehicle collision occurs and an inertial force acts on a seat that is unable to resist the inertia to rotate the seat forward or rearward, the outer link portion 20 in which the height adjustment device 21 and the rack gear link 22 are provided can restrict the rotation of the link, but the inner link portion 10 may be rotated due to the absence of a device that can directly restrict the link, such as the outer link portion 20. If the inner link portion 10 is rotated, the seat frame 1 is also rotated, and this may cause the passenger to be injured.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide an apparatus for preventing rotation of a seat frame for a vehicle which can prevent a seat frame from rotating when vehicle collision occurs. A rotation prevention link is configured on an inner link portion of a seat frame that adjust the height of a seat, and when vehicle collision occurs, an outer link portion is restricted by a height adjustment device and a rack gear and the inner link portion is restricted by the rotation prevention link.

In one aspect of the present invention, an apparatus for preventing rotation of a seat frame for a vehicle having the seat frame that includes an inner link portion and an outer link portion that may be provided with a height adjustment device to adjust a height of a seat and a rack gear link, may include a height link, wherein one end portion of the height link may be pivotally connected to a set bracket and the other end portion thereof may be pivotally connected to a cushion side member, and a rotation prevention link provided on the inner link portion wherein one end portion of the rotation prevention link may be pivotally hinged to the height link and the other end portion thereof may be movably installed on the set bracket.

A slot may be formed on the set bracket to slidably receive the other end portion of the rotation prevention link so as to enable the other end portion of the rotation prevention link to move therein wherein a gear portion may be formed on an inner circumference of the slot to selectively lock the other end portion of the rotation prevention link thereto.

The other end portion of the rotation prevention link includes a lock pin and the lock pin may be selectively locked to the gear portion.

The one end portion of the rotation prevention link may be pivotally hinged to the height link between the one end portion and the other end portion of the height link.

One end portion of an elastic member may be provided on the one end portion of the rotation prevention link and the other end portion of the elastic member may be fixed to the height link.

In another aspect of the present invention, while an inertial force acts on the rotation prevention link in one direction of the vehicle in a front vehicle collision, the other end portion of the rotation prevention link may be inserted and locked in the gear portion to suppress the rotation of the rotation prevention link and the height link, and while an inertial force acts on the rotation prevention link in the other direction of the vehicle in a rear vehicle collision, the rotation prevention link may be pressed toward the set bracket side by the rotation of the height link and the other end portion of the rotation prevention link may be pressingly supported on a lower surface of the slot to suppress the rotation of the rotation prevention link and the height link by the spring force of the elastic member.

According to the apparatus for preventing rotation of a seat frame according to various aspect of the invention, when vehicle collision occurs in a state where the rotation prevention link that may be installed on the inner link portion of the seat frame connects the height link and the set bracket to each other, the rotation prevention link may be pressingly supported on the upper side or lower side of the set bracket to maximally suppress the rotation of the inner link portion, and thus the rotation of the seat frame may be prevented. Accordingly, a passenger can be maximally protected from an injury.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIGS. 2A and 2B are views illustrating a seat frame in the related art, wherein

FIGS. 4A and 4B are views illustrating an apparatus for preventing rotation of a seat frame of a seat frame according to an exemplary embodiment of the invention, wherein

FIGS. 5A to 5C are views illustrating the state where the apparatus for preventing rotation of a seat frame according to an exemplary embodiment of the invention is installed on the height-adjusted seat frame, wherein

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIGS. 3 to 5C are views illustrating a vehicle seat frame and an apparatus for preventing rotation of a seat frame according to an exemplary embodiment of the invention.

An apparatus for preventing rotation of a seat frame 1 for a vehicle according to an exemplary embodiment of the invention, as illustrated in the drawing, includes an outer link portion 20 and an inner link portion 10, and the outer link portion 20 and the inner link portion 10 are connected to each other through a cross pipe 30 to interlock with each other.

The outer link portion 20 and the inner link portion 10 of the seat frame 1 have the same construction, and the details thereof will be described with reference to FIG. 3.

Figure 3:
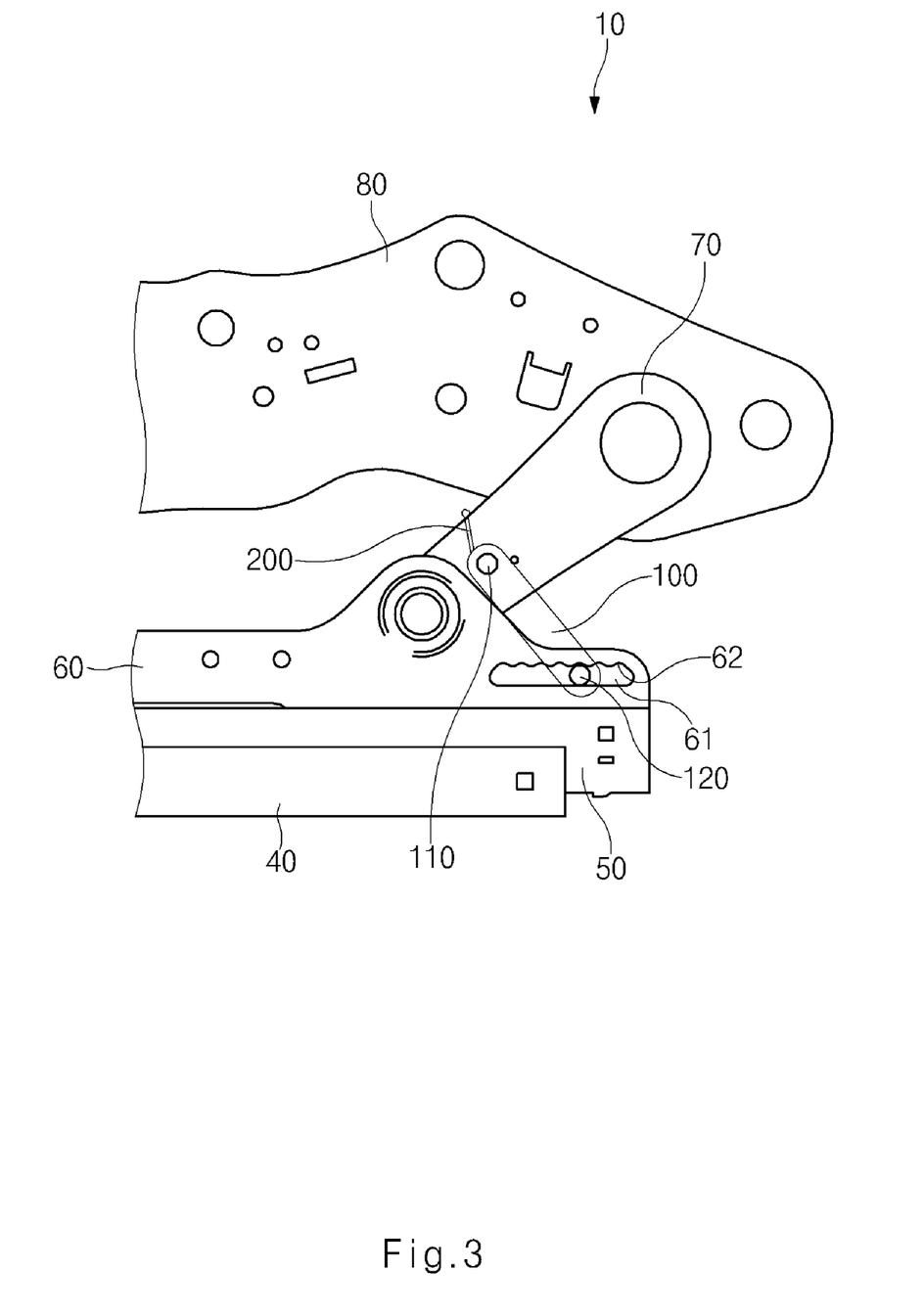
FIG. 3 is an enlarged view illustrating an inner link portion of a seat frame to which an apparatus for preventing rotation of a seat frame according to an exemplary embodiment of the invention is applied.

The seat frame 1, as illustrated in FIG. 3, includes a lower slide rail 40 fixed to the bottom surface of a vehicle compartment, an upper slide rail 50 sliding forward and rearward on the lower slide rail 40, a set bracket 60 fixed onto the upper slide rail 50, a height link 70 one end of which is rotatably coupled to the set bracket 60, and a cushion side member 80 which is fixed to a seat cushion and to which the other end of the height link 70 is rotatably coupled to connect to the set bracket 60.

In the seat frame 1 as constructed above, a height adjustment device 21 is provided on the outer link portion 20 and a rotation prevention link 100 is provided on the inner link portion 10, so that when vehicle collision occurs, the rotation of the respective link portions 10 and 20 is suppressed to prevent the seat frame 1 from being rotated.

That is, the height adjustment device 21 is constructed in a manner that a pinion gear is installed on the cushion side member 80 of the outer link portion 20, and one end of a rack gear link 22, which is tooth-engaged with the pinion gear, is rotatably installed on the set bracket 60.

On the other hand, as illustrated in FIG. 3, one end of the rotation prevention link 100 is rotatably hinged on one side of the height link 70, and the other end thereof is installed on the set bracket to be movable forward and rearward as a lock pin 120.

In this case, a slot 61 for enabling the lock pin 120 to be movable therein is formed on the set bracket 60 on which the lock pin 120 of the rotation prevention link 100, and a gear portion 62, in which the lock pin 120 is locked, is formed on an inner circumference of the slot 61. In particular, the gear portion 62 as described above may be formed on the whole inner circumference of the slot 61, and it is preferable that the gear portion 62 is formed only on the inner upper surface of the slot 61 as illustrated in FIG. 3.

Accordingly, in the case where the inner link portion 10 intends to rotate by the inertia that is generated when vehicle collision occurs, the lock pin 120 is pressingly supported on the upper gear portion 62 of the slot 61 (when front vehicle collision occurs) or on the inner lower surface (when rear vehicle collision occurs), and thus the rotation of the inner link portion 10 can be suppressed.

Also, a torsion spring 200 is provided on the hinge portion 110 of the rotation prevention link 100, and one end portion of the torsion spring 200 is locked in the height link 70 while the other end portion thereof is locked in the rotation prevention link 100. Accordingly, when rear vehicle collision occurs, a spring force of the torsion spring 200 is applied to the lock pin 120, and thus the lock pin 120 is supported to be in contact with the inner lower surface of the slot 61 with large force.

The operation of the rotation prevention link as constructed above according to an exemplary embodiment of the invention will be described.

Figure 4A:
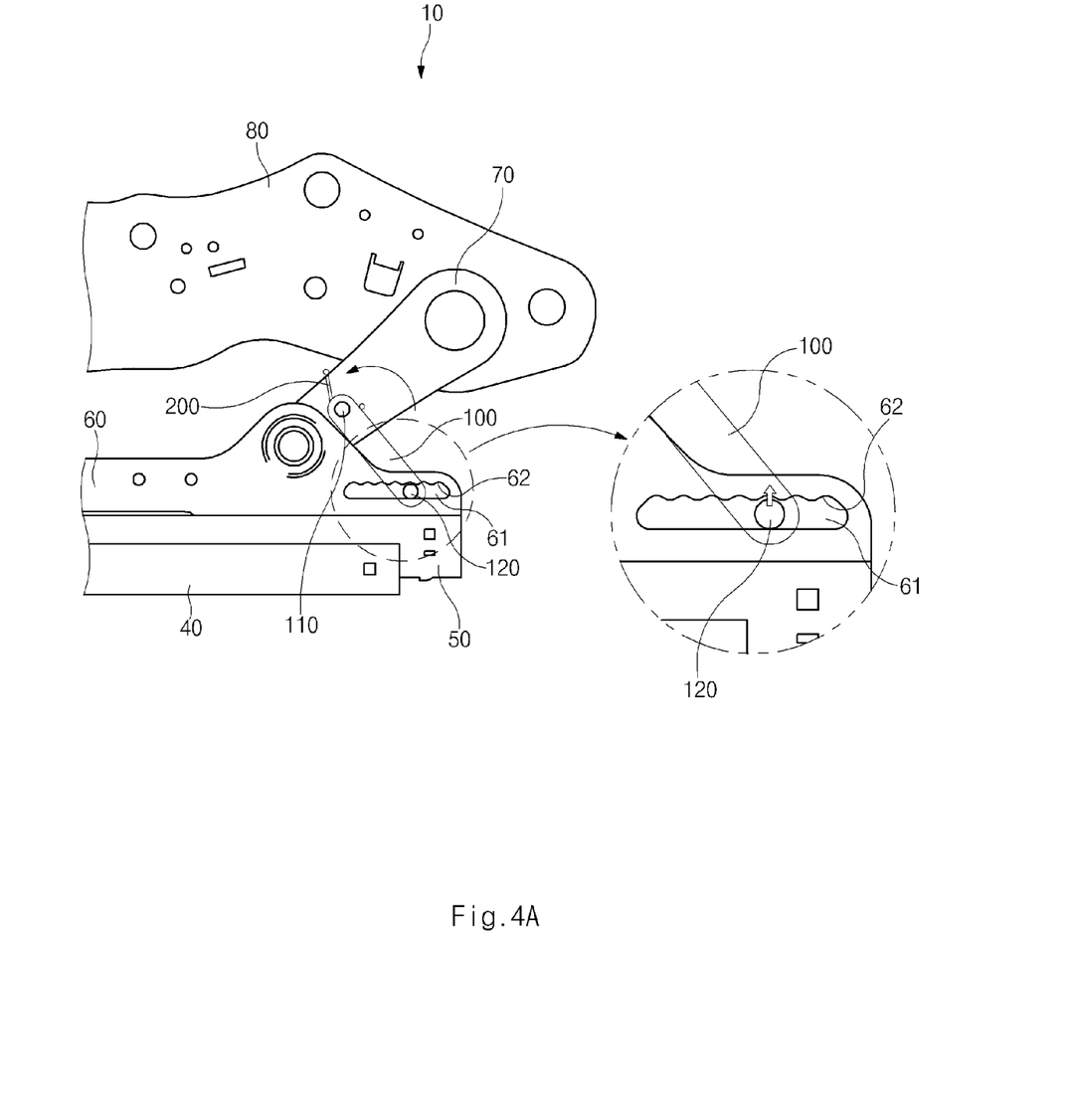
FIG. 4A is a view illustrating the apparatus for preventing rotation of a seat frame when front vehicle collision occurs.

First, when front vehicle collision occurs, an inertial force, that is, a large rotating force that intends to rotate forward is abruptly generated to the seat frame 1 as indicated by an arrow in FIG. 4A. At this time, since the outer link portion 20 can suppress the rotating force by the height adjustment device 21 and the rack gear link 22 as described above in the related art, only the inner link portion 10, on which the rotation prevention link 100 is provided, will be described according to an exemplary embodiment of the invention.

On the other hand, the height link 70 is rotated counterclockwise (based on FIG. 4A) by the rotating force acting as illustrated in FIG. 4A, and by the rotation of the height link 70, and the rotation prevention link 100, which interlocks with the height link 70, intends to rotate counterclockwise. At this time, the lock pin 120 of the rotation prevention link 100 that is coupled to the slot 61 of the set bracket 60 is inserted and locked in the gear portion 62 of the slot 61, and thus the rotation of the rotation prevention link 100 and the height link 70 is suppressed. Accordingly, the rotation of the inner link portion 10 is prevented.

Figure 4B:
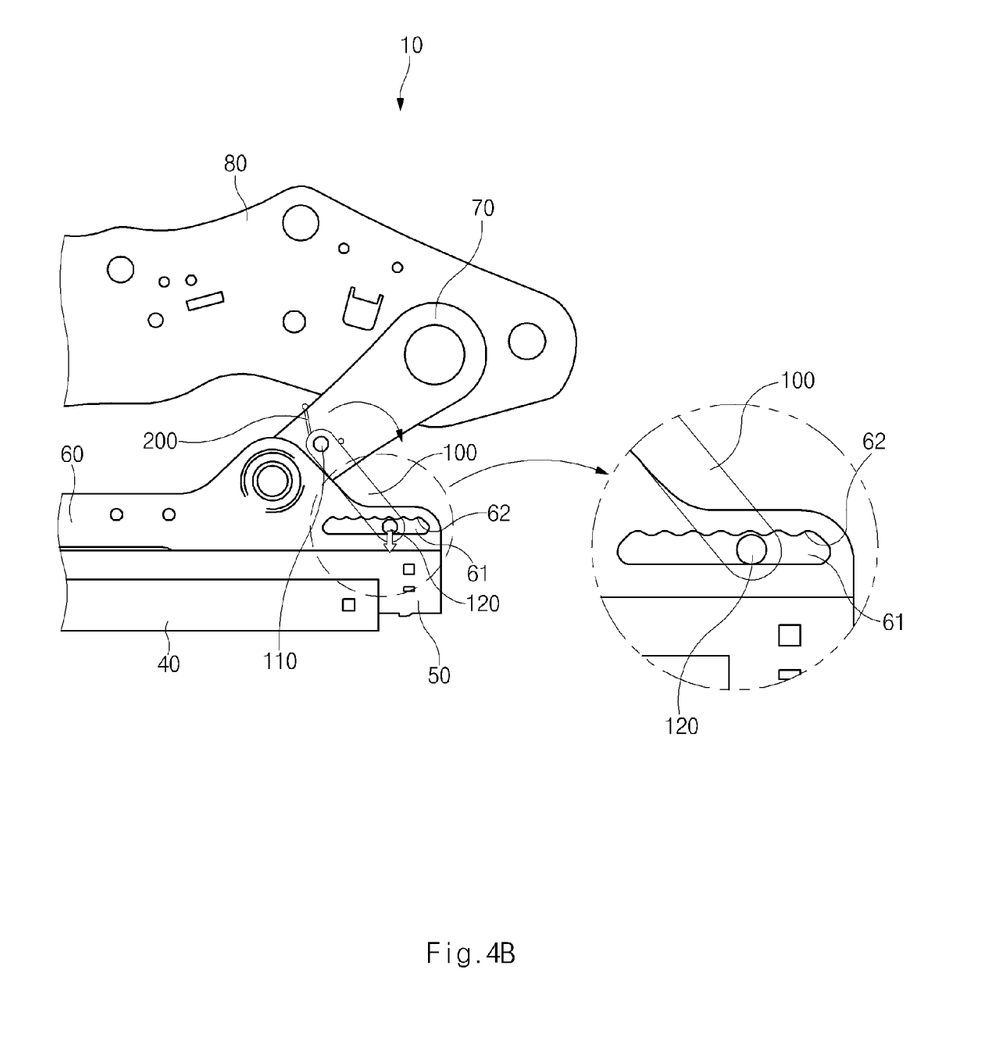
FIG. 4B is a view illustrating the apparatus for preventing rotation of a seat frame when rear vehicle collision occurs.

Also, when rear vehicle collision occurs, an inertial force, that is, a large rotating force that intends to rotate rearward is abruptly generated to the seat frame 1 as indicated by an arrow in FIG. 4B. At this time, the height link 70 is rotated clockwise (based on FIG. 4B) by the rotating force, the rotation prevention link 100 is pressed toward the side of the set bracket 60 by the rotation of the height link 70, and the lock pin 120 of the rotation prevention link 100 is pressingly supported on the lower surface of the slot 61 of the set bracket 60 by the spring force of the torsion spring 200 that is installed on the hinge portion 110 of the rotation prevention link 100 to suppress the rotation of the rotation prevention link 100 and the height link 70. Even if the lock pin 120 is pushed and moved rearward on the slot 61, the lock pin 120 is locked in and supported by the rear end portion of the slot 61, and thus the rotation of the rotation prevention link 100 and the height link 70 can be restricted.

Accordingly, when the forward or rearward vehicle collision occurs, the rotation of the seat frame 1 is prevented, and thus the passenger can be safely protected from an injury.

Figure 5A:
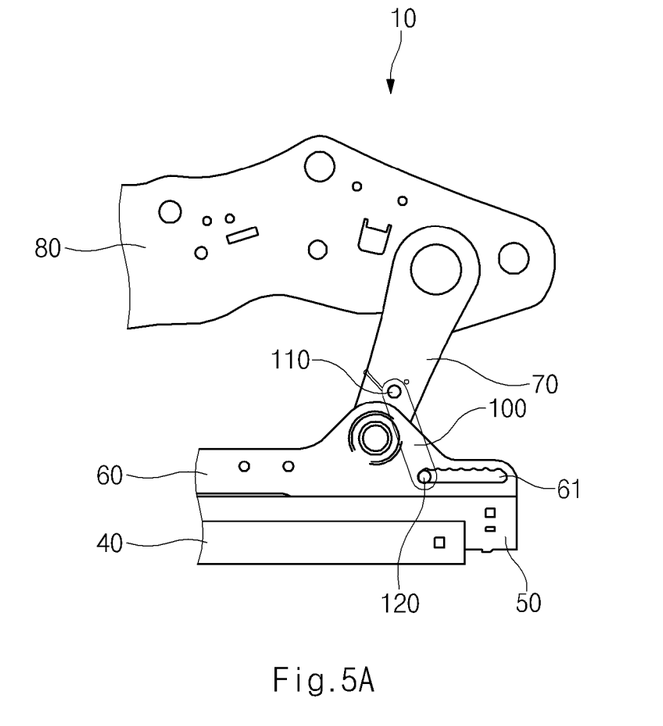
FIG. 5A shows a seat frame in an ascending state.
Figure 5B:
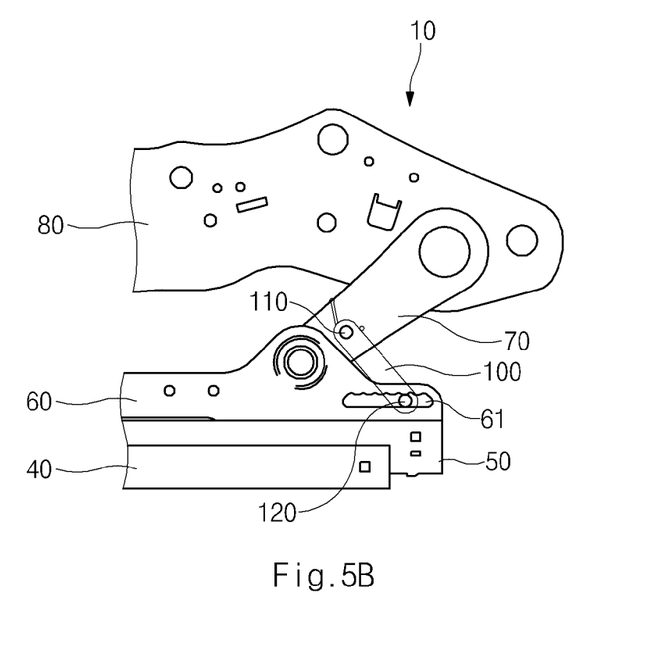
FIG. 5B shows a seat frame in a middle state.
Figure 5C:
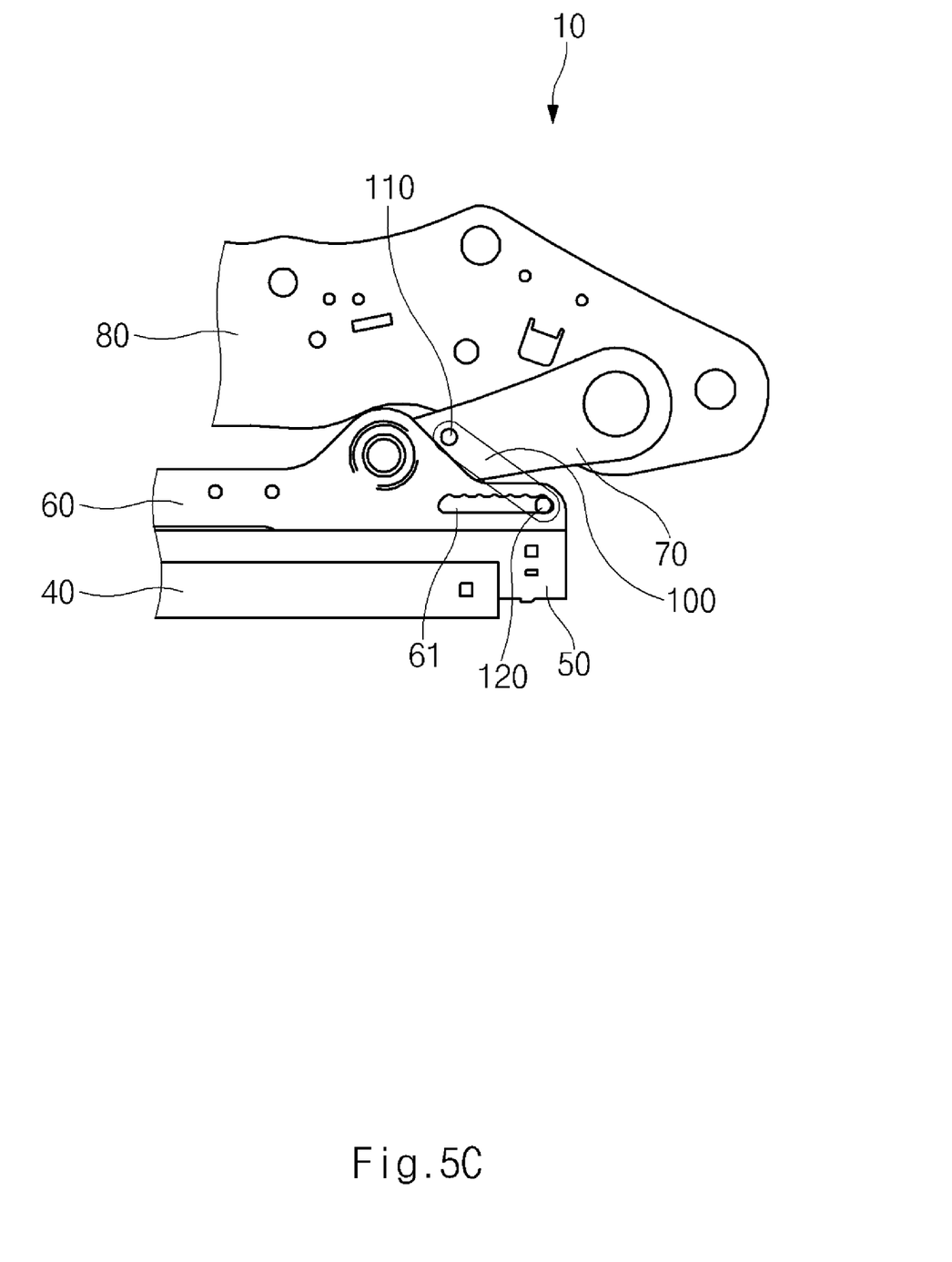
FIG. 5C shows a seat frame in a descending state.

Also, the rotation prevention link 100 can maintain the same function in the whole section of the height link 70 when the height of the seat is adjusted as illustrated in FIGS. 5A to 5C.

That is, if the height of the seat frame 1 is increased as illustrated in FIG. 5A, the height link 70 rotates slowly counterclockwise to stand up by the cushion side member 80 that ascends together with the seat, and the rotation prevention link 100 rotates clockwise around the axis of the hinge portion 110 to be pulled and stand up toward the height link 70 by the standing height link 70. In this case, the lock pin 120 of the lower end portion of the rotation prevention link 100 is locked and located in the front end portion of the slot 61 of the set bracket 60.

Also, as illustrated in FIG. 5B, if the seat frame 1 descends to the intermediate height position, the height link 70 rotates slowly clockwise to be inclined by the descending cushion side member 80, and the rotation prevention link 100 rotates counterclockwise around the axis of the hinge portion 110 to be inclined by the height link 70 being inclined to make the height link 70 and the rotation prevention link 100 roughly "λ"-shaped. At this time, the lock pin 120 of the lower end portion of the rotation prevention link 100 is located on the center portion of the slot 61 of the set bracket 60.

Also, as illustrated in FIG. 5C, if the seat frame 1 has completely descended, the height link 70 further rotates clockwise to be completely inclined by the descending cushion side member 80, and the rotation prevention link 100 further rotates counterclockwise around the axis of the hinge portion 110 to be completely inclined by the height link 70. At this time, the lock pin 120 of the rotation prevention link 100 is locked and located in the rear end portion of the slot 61 of the set bracket 60.

For convenience in explanation and accurate definition in the appended claims, the terms "upper", "lower", "inner", "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for preventing rotation of a seat frame for a vehicle having the seat frame that includes an inner link portion and an outer link portion that is provided with a height adjustment device to adjust a height of a seat and a rack gear link, comprising:

a height link, wherein a first end portion of the height link is pivotally connected to a set bracket and a second end portion of the height link is pivotally connected to a cushion side member; and a rotation prevention link provided on the inner link portion wherein a first end portion of the rotation prevention link is pivotally hinged to the height link and a second end portion of the rotation prevention link is movably installed on the set bracket, wherein a first end portion of an elastic member is provided on the second end portion of the rotation prevention link and a second end portion of the elastic member is fixed to the height link, and wherein:

while an inertial force acts on the rotation prevention link in one direction of the vehicle in a front vehicle collision, the second end portion of the rotation prevention link is inserted and locked in a gear portion to suppress rotation of the rotation prevention link and the height link, and while an inertial force acts on the rotation prevention link in the other direction of the vehicle in a rear vehicle collision, the rotation prevention link is pressed toward the set bracket by rotation of the height link and the second end portion of the rotation prevention link is pressingly supported on a lower surface of a slot framed on the set bracket and slidably receiving the second end portion of the rotation prevention link to suppress the rotation of the rotation prevention link and the height link by spring force of the elastic member.

2. The apparatus for preventing rotation of the seat frame according to claim 1, wherein the slot is formed on the set bracket to slidably receive the second end portion of the rotation prevention link so as to enable the second end portion of the rotation prevention link to move therein; and wherein the gear portion is formed on an inner circumference of the slot to selectively lock the second end portion of the rotation prevention link thereto.

3. The apparatus for preventing rotation of the seat frame according to claim 2, wherein the second end portion of the rotation prevention link includes a lock pin and the lock pin is selectively locked to the gear portion.

4. The apparatus for preventing rotation of the seat frame according to claim 1, wherein the first end portion of the rotation prevention link is pivotally hinged to the height link between the first end portion and the second end portion of the height link.

* * * * *